(No Model.) 2 Sheets—Sheet 1.
W. T. MAGRUDER.
COTTON PLANTER.
No. 371,773. Patented Oct. 18, 1887.
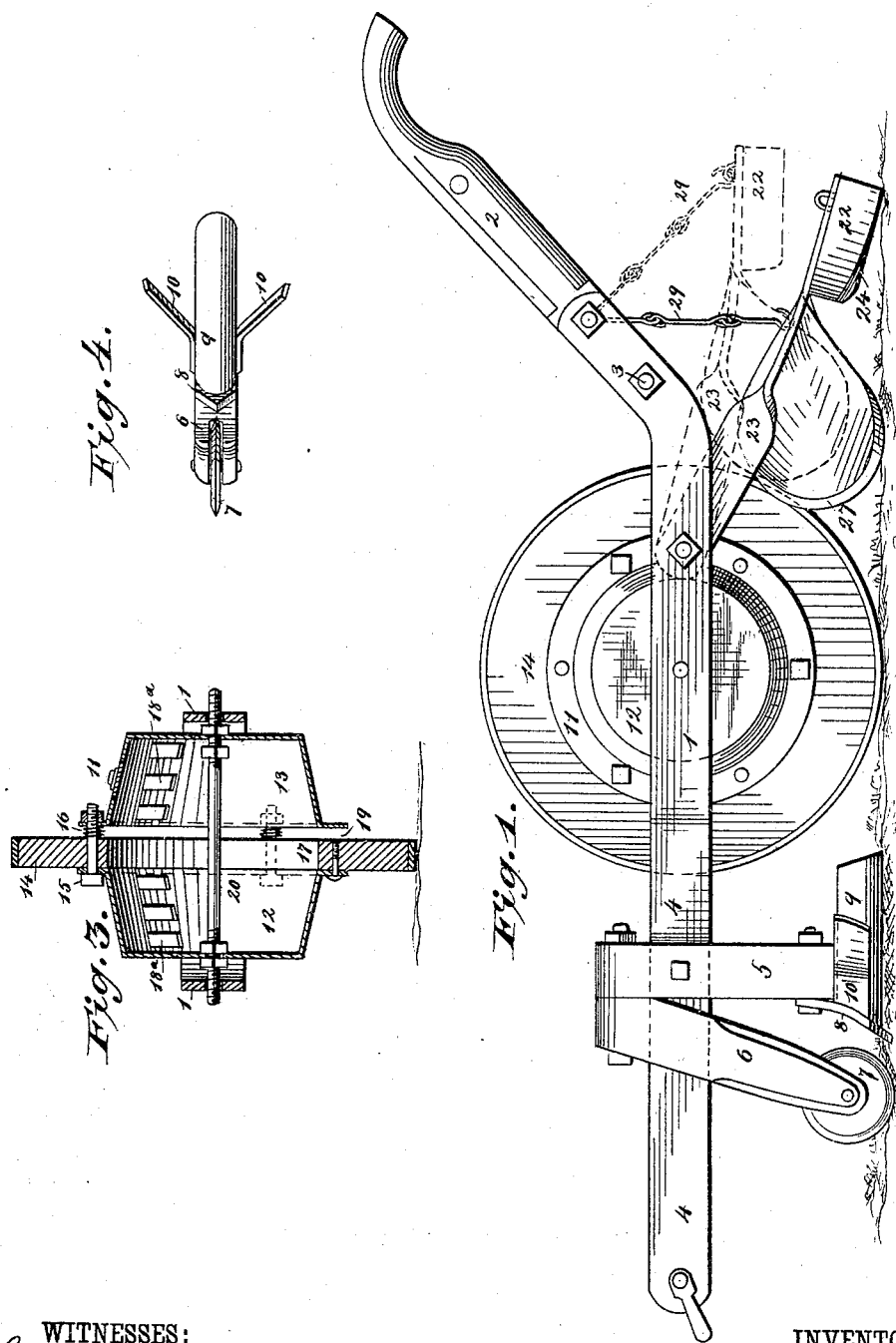
WITNESSES:
George Binkenburg
C. Sedgwick
INVENTOR:
W. T. Magruder
BY Munn & Co
ATTORNEYS.

(No Model.) 2 Sheets—Sheet 2.
W. T. MAGRUDER.
COTTON PLANTER.
No. 371,773. Patented Oct. 18, 1887.
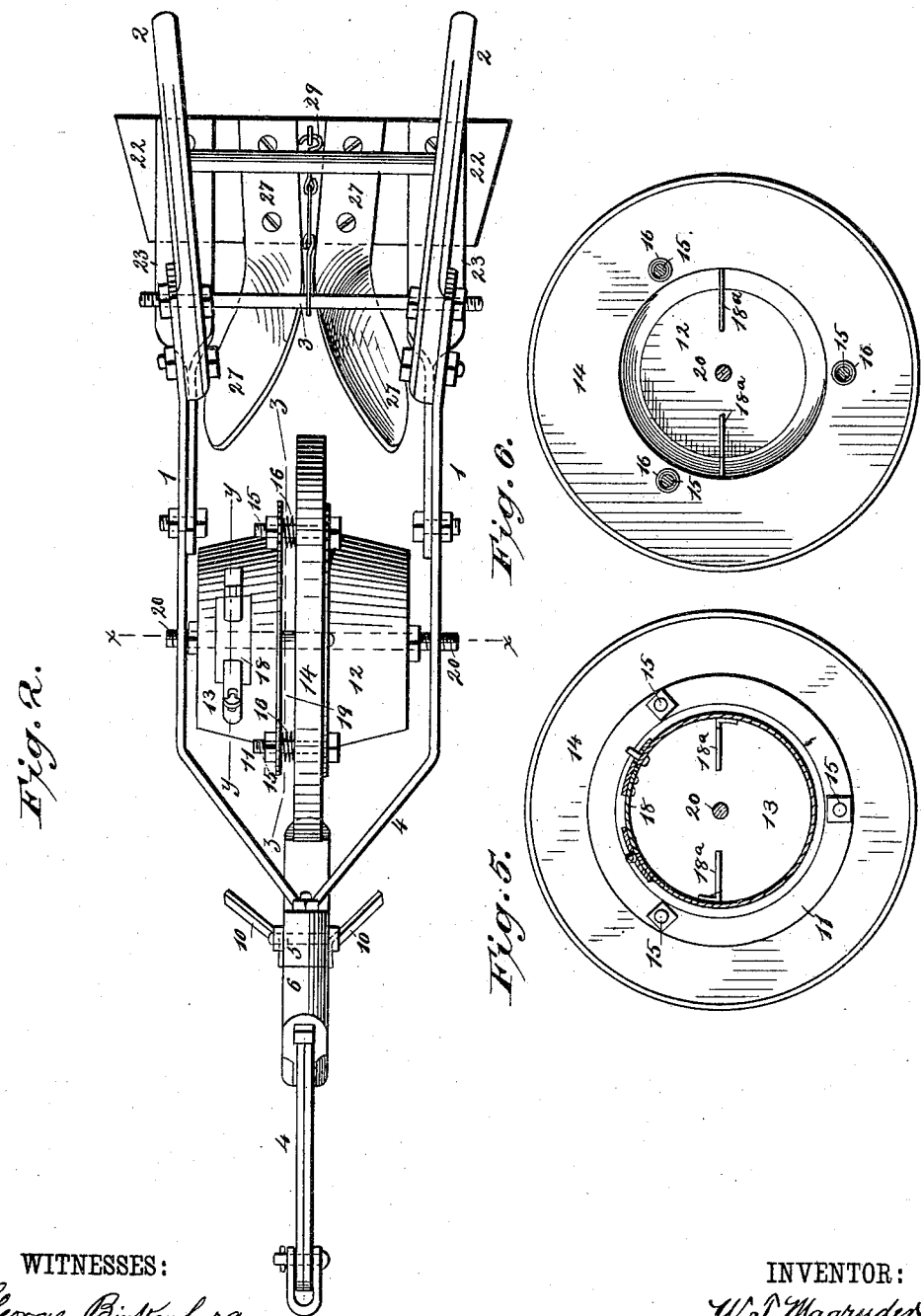
WITNESSES:
George Binkenburg
C. Sedgwick
INVENTOR:
W. T. Magruder
BY Munn & Co
ATTORNEYS.

UNITED STATES PATENT OFFICE.

WILLIAM THOMAS MAGRUDER, OF PORT GIBSON, MISSISSIPPI, ASSIGNOR TO BENJAMIN H. MAGRUDER, TRUSTEE, OF SAME PLACE.

COTTON-PLANTER.

SPECIFICATION forming part of Letters Patent No. 371,773, dated October 18, 1887.

Application filed May 5, 1887. Serial No. 237,223. (No model.)

*To all whom it may concern:*

Be it known that I, WILLIAM THOMAS MAGRUDER, of Port Gibson, in the county of Claiborne, in the State of Mississippi, have invented a new and Improved Cotton-Planter, of which the following is a full, clear, and exact description.

My invention relates to a cotton-planter, and has for its object to so improve the construction of such as that it will be simple, durable, light of draft, and easily operated without extra effort, and wherein, also, the opening of the furrow for the seed may at all times and under all conditions of the seed-bed be easily regulated and controlled as to depth, wherein, also, the distribution of the seed will at all times be certain and regular as to quantity, and the seed, when sown, be covered to a suitable depth with pulverized soil, whereby the atmosphere is excluded and rapid germination obtained.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of the planter. Fig. 2 is a plan view thereof. Fig. 3 is a longitudinal vertical central section through the conical hoppers and carrying-wheel on line $x$ $x$ of Fig. 2. Fig. 4 is a bottom plan of the plow and colter. Fig. 5 is a transverse vertical section through one side of the hopper on line $y$ $y$ of Fig. 2; and Fig. 6 is a transverse vertical section through the hopper, taken on line $z$ $z$ of Fig. 2.

In carrying out the object of the invention a parallel-spaced frame, 1, is constructed from light flat iron, having the rear ends thereof turned up at a suitable angle to attach the handles 2, the first or lower round connecting said handles consisting of an iron rod, 3, both ends of which are threaded and provided with two nuts, one outside and the other inside said handles, whereby the frame may be contracted, if found advisable. The upper round of the handles may consist of any form of bar rigidly secured thereto. The forward portion of the frame consists of beams 4, formed by a union of the spaced iron sides connected in any suitable manner.

Two standards, 5 and 6, are entered upon the beam 4, through suitable apertures in their edges, and secured to said beam by bolts or other equivalent devices, the upper ends of said standards extending above the beam being so united that the one standard, 5, will project vertically downward, and the other standard, 6, at a forward inclination in front of the aforesaid standard 5. The standard 6 is adapted to carry a circular rotary colter, 7, about ten inches in diameter, which colter precedes a small shovel-plow, 8, followed by a block, 9, having a convex under surface to keep open the furrow, and to each side of said block an outwardly and rearwardly extending wing or fender, 10, is secured, adapted to remove any loose clods near the furrow.

The plow 8 is attached to the forward edge of the standard 5, the block 9 to the end of said standard, projecting horizontally rearward a distance at one end, the other short end of said block abutting with and conforming to the contour of the plow, the fenders 10 being attached to the forward end of the block.

The seed-drum 11 is constructed of two cone-shaped sections, 12 and 13, each about ten inches in diameter at one end and about nineteen inches in diameter at the base. One section, 12, is flanged at the base and attached by suitable bolts centrally upon the left-hand side of a wheel, 14, made preferably of hard wood and about twenty-eight inches in diameter, with an iron tire. The right-hand section, 13, of the drum is attached to the wheel, in the same plane with the opposite section, by four or more bolts, 15, preferably four, having spiral or coil springs 16 intervening the flange and face of the wheel, the said wheel being provided with a central aperture, 17, nearly equal in diameter to the diameter of the cone-sections at the base. The section 13 is provided with a door, 18, upon one side, through which the seed is entered. The said door may, however, be located in the opposite section, 12, if found desirable.

Each section of the seed-drum is provided with three fingers, $18^a$, about one inch wide and five inches long, attached upon opposite faces of the drum inside, the fingers in one section aligning horizontally with the fingers in the opposite section, the purpose thereof being to prevent clogging of the seeds by breaking the mass and to assist in lifting them in conjunction with the rotary motion of the wheel, causing a perfect separation of the seeds by pitching them forward (the drum being but half filled) and a regular flow through the seed-opening 19 into the furrow.

The drum is suspended in the frame 1 by means of an axle, 20, passing through the drum and journaled in the frame. The axle 20 is threaded at each end to receive suitable nuts, as shown in Fig. 3. Upon the left, one nut is screwed against the inside of section 12, and also one against the outer side, making the same stationary upon the axle. Within the section 13 the inner nut is not made to engage the face, so that the nut which engages the outer face of said section 13 may be run in or out, according as the seed-opening 19 is desired large or small. Thus the quantity of seed to be dropped is regulated.

The depth of the furrow is regulated by the leverage afforded the operator using the frame through the handles as a lever, the fulcrum being the drum-carrying wheel. This operation does not interfere in the least with the distribution of the seeds, or covering or compressing them, as will be hereinafter set forth.

A covering-block, 22, adapted to trail behind the planters, is pivoted, by means of forwardly-extending arms 23, attached upon the top at each end, to the frame 1. The block 22 is provided with a transverse central groove, 24, upon its under surface, of greatest depth at the front and decreasing rearwardly, the said grooved surface extending nearly from end to end of said block.

To the upper surface of the block, each side of the center, the stems of two outwardly-inclined and diverging share-like shovels, 27, are secured, which shovels are adapted to project forward beyond the block 22 each side of the hopper-wheel, and in substantial alignment with the colter and furrow-opener, as shown in Fig. 1. By means of a suitable chain, 29, the block and shovels may be elevated when desired, as illustrated in dotted lines, Fig. 1.

The combined action of the colter-wheel and the shovels prevents any lateral movement of the machine and keep it in line of traction on the seed-bed, even upon an inclined surface, without any extra effort or trouble to the operator.

It will be observed that the colter-wheel in front splits the seed-bed, clearing the way for the plow, that the stationary block in connection with the plow keeps the furrow open, and the fenders remove any troublesome clods. The seeds thus drop in a well-prepared furrow, and are covered with the pulverized earth by the shovels 27, and the said earth compressed upon the seeds by the trailing tail-block. Extra weight may be added to the tail or compressing block, as the nature of the ground may demand.

Having thus fully described my invention, what I claim as new, and desire to secure by Letters Patent, is—

1. The combination, with the frame, the handles thereof, and a conical seed-hopper adjustably mounted upon an apertured disk journaled in said frame, of a vertical and an inclined standard attached to the forward portion of said frame, a colter-wheel journaled in the lower end of said inclined standard, a plow at the rear of said colter, and an opening-block at the rear of said plow, both attached to the vertical standard, and fenders attached to each side of said block, substantially as shown and described.

2. The combination, with the frame 1, beams 4, and handles 2, a sectional conical seed-hopper, 11, adjustably mounted upon an apertured disk, 14, and journaled in said frame, of the vertical standard 5, having attached to its forward edge a plow-point, 8, an opening-block, 9, attached to the lower end thereof, and fenders 10, secured to said block, the inclined standard 6, preceding said standard 5, a colter-wheel, 7, pivoted in said standard, and adjustable shovels 27, and a compressing-block, 22, pivoted to said frame in the rear, substantially as shown and described.

3. The combination, with the frame 1, beams 4, and handles 2, and a sectional conical seed-hopper, 11, mounted upon opposite sides of an apertured disk, 14, one section rigidly attached thereto and the other adjustably secured, the said disk mounted in the said frame, of the attached inclined and vertical standards 5 and 6, the colter 7, plow 8, opening block 9, and fenders 10, supported by said standards, the compressing-block 22, having a concaved under face, pivoted to the rear of said frame, and shovels 27, secured to said block 22, adapted to follow said disk, all arranged to operate substantially as shown and described.

WILLIAM THOMAS MAGRUDER.

Witnesses:
L. R. LEVY,
A. JORDAN.